Nov. 27, 1951         J. W. SMITH         2,576,366

BISCUIT LOADING MECHANISM FOR CONVEYERS

Filed May 7, 1947         4 Sheets-Sheet 1

INVENTOR.
John W. Smith
BY
Attorney.

Nov. 27, 1951        J. W. SMITH        2,576,366

BISCUIT LOADING MECHANISM FOR CONVEYERS

Filed May 7, 1947        4 Sheets-Sheet 2

INVENTOR.
John W. Smith
BY
Attorney.

Nov. 27, 1951    J. W. SMITH    2,576,366
BISCUIT LOADING MECHANISM FOR CONVEYERS
Filed May 7, 1947    4 Sheets-Sheet 4

INVENTOR.
John W. Smith
BY
Otto A. Earl
Attorney.

Patented Nov. 27, 1951

2,576,366

UNITED STATES PATENT OFFICE 2,576,366

BISCUIT LOADING MECHANISM FOR CONVEYERS

John W. Smith, Battle Creek, Mich., assignor to Battle Creek Bread Wrapping Company, Battle Creek, Mich.

Application May 7, 1947, Serial No. 746,535

32 Claims. (Cl. 198—59)

This invention relates to improvements in a loading machine.

The principal objects of this invention are:

First, to provide a machine for loading a predetermined number of biscuits or similar flat articles on a flat supporting panel while the panel is being continuously advanced by a conveyor to a wrapping machine.

Second, to provide a machine in which biscuits or other disk-like articles may be placed in quantity in a series of hoppers to be loaded automatically from the hoppers in a plurality of predetermined numbers and arrangements on supporting panels carried by a continuously moving conveyor.

Third, to provide a loading machine in which storage hoppers and loading mechanism for feeding a predetermined number of articles from the bottoms of the hoppers are oscillated in timed relationship with a loading conveyor so that the articles are fed from the hoppers to supporting panels in the flights of the loading conveyor.

Fourth, to provide mechanism for supporting a stack of biscuits or other relatively soft and fragile food articles in a storage hopper while a loading bar advances a predetermined number of the articles from the bottom of the hopper onto a supporting panel in a loading conveyor and then lowering the articles in the hopper gently for the next successive operation of the loading bar.

Fifth, to provide a loading device which may be attached to the loading conveyor of an existing wrapping machine to automatically position the desired number of articles in the pockets of the loading conveyor.

Sixth, to provide operating cams and linkage for advancing a storage hopper for articles in synchronized relationship with a flight of a loading conveyor and simultaneously supporting the upper articles in the hopper while a predetermined number of articles in the bottom of the hopper are advanced onto the loading conveyor.

Seventh, to provide a machine for automatically loading fragile articles which will cause a minimum of breakage of the articles being handled.

Eighth, to provide a loading device for a wrapping machine which is readily adjustable to load articles in different numbers and stacks on a loading conveyor.

Other objects and advantages pertaining to the details and economies of the invention will be apparent from the following description and claims.

The drawings, of which there are four sheets, illustrate a preferred form of my article loading mechanism as attached to the loading conveyor of a food wrapping machine.

Figure 1:
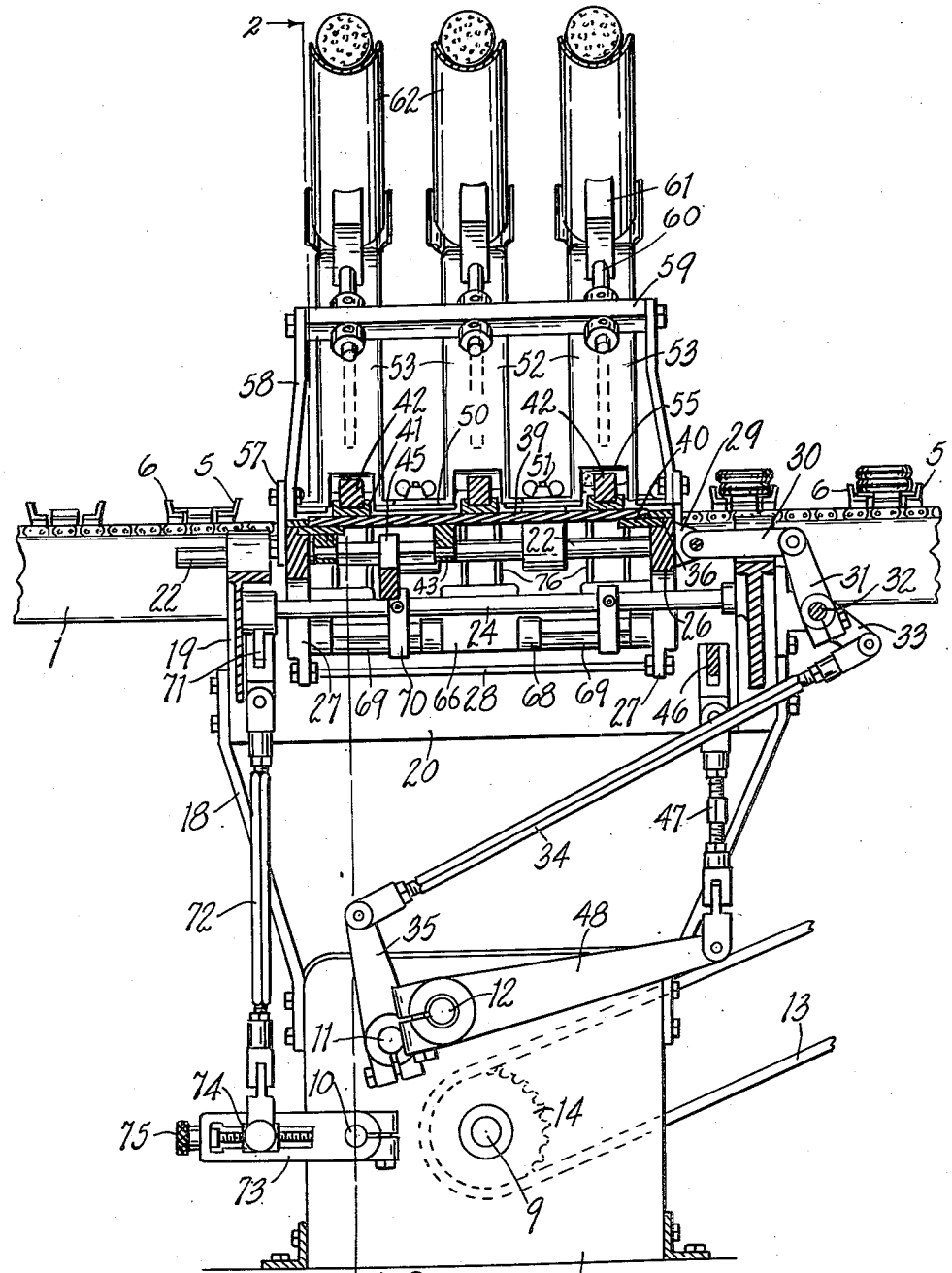
Fig. 1 is a fragmentary longitudinal vertical cross sectional view along the broken line 1—1 in Fig. 2.

In the past it has been customary to wrap small baked goods such for example as biscuits and cookies on flat supporting panels by manually placing the desired number of cookies on the supporting panels as they were advanced past a loading station on a loading conveyor. My present invention provides means for automatically loading the desired number of cookies on successive bottom panels as the panels are moved past the loading mechanism by the flights of a loading conveyor. In some instances the bottom panels may be eliminated and the cookies loaded directly on the conveyor. The mechanism is effective for loading biscuits, cookies, or other generally flat articles which may be stacked.

The drawings illustrate a loading conveyor having horizontal side rails 1 joined by transverse shafts 2 rotatably supporting a plurality of sprockets 3. The sprockets 3 are engageable with and support a plurality of conveyor chains 4 which are arranged in a well known manner to continuously advance a series of front pocket members 5, rear pocket members 6 and end pocket members 7. The chains are relatively adjustable angularly and transversely with respect to each other to vary the size of the pockets of the loading conveyor.

Figure 2:
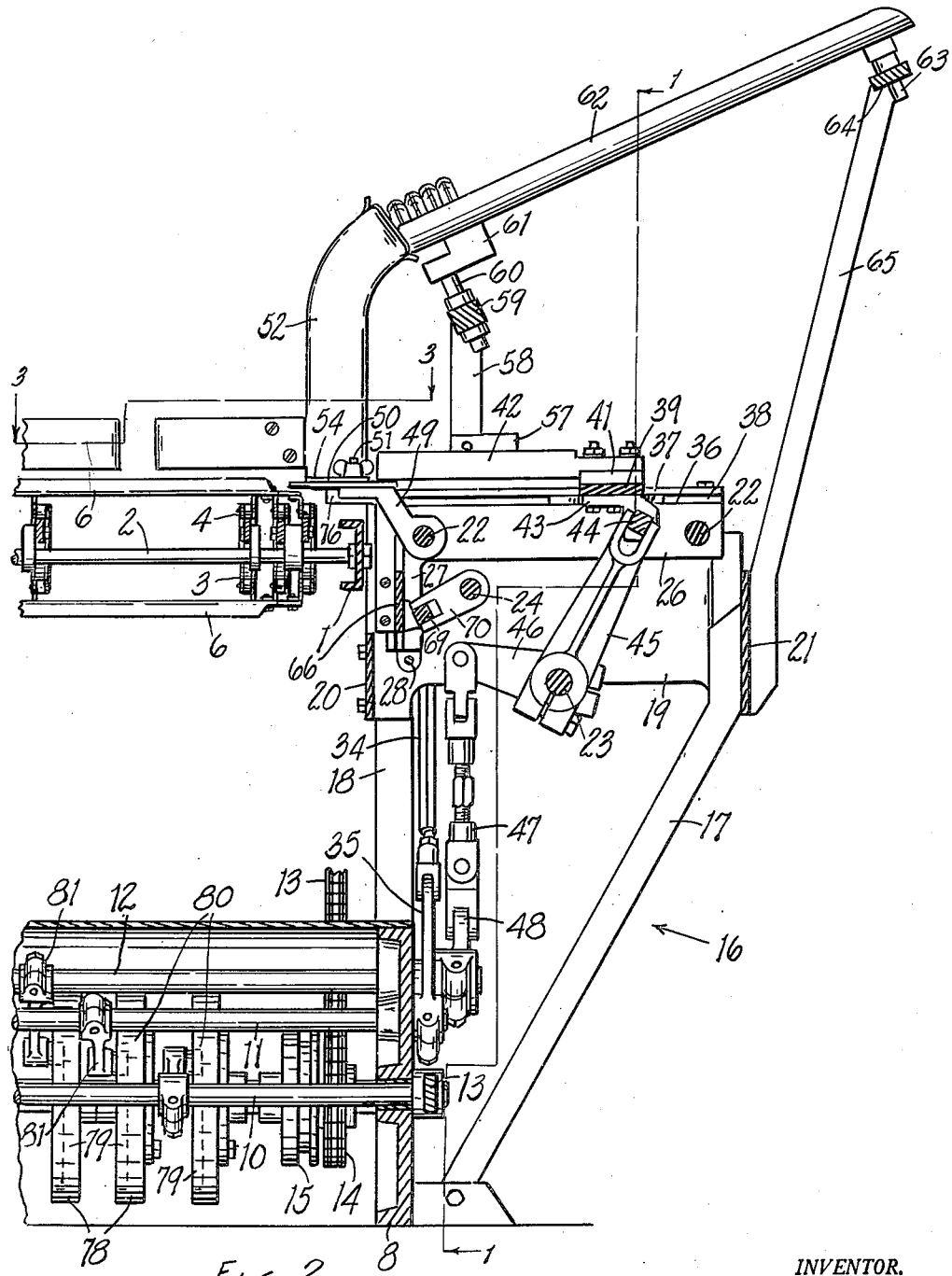
Fig. 2 is a fragmentary transverse vertical cross sectional view along the broken line 2—2 in Fig. 1.

The loading mechanism comprises a base having flanged side members 8 arranged to be positioned on and secured to the floor underneath the loading conveyor. The side members form journals for a driving shaft 9 and three rock shafts 10, 11 and 12 (see Fig. 1). The driving shaft 9 is arranged to be driven simultaneously in timed relationship with the conveyor chains 4 by the sprocket chain 13 driving the sprocket 14 rotatably mounted on the driving shaft 9. A clutch conventionally illustrated at 15 in Fig. 2 is provided for engaging the sprocket 14 with the drive shaft 9.

Each side of the base is secured to and supports a vertical and laterally extending bracket or pedestal generally indicated at 16. The two pedestals are of identical opposed construction so only one will be described. The pedestal 16 consists of upwardly and outwardly sloping outer braces 17 and vertically extending inner corner posts 18. The braces and posts are connected at their upper ends by the end plates 19. The end plates are in turn connected by longitudinally extending inner plates 20 and outer plates 21. The upper portions of the end plates 19 define journals for a pair of longitudinally extending slide rods 22 which extend parallel to the conveyor and are slidable along their axes as will be explained presently. The end plates 19 also form journals for a rock shaft 23 and a rock shaft 24 extending generally parallel to the conveyor chains 4. The inner edges of the end plates are arranged to be bolted to the side rails 1 of the loading conveyor as indicated at 25 in Fig. 3.

The slide rods 22 form part of and slidably support a carriage consisting of end plates 26 having depending inner ends 27 connected at the bottom by a tie rod 28. The forward or advanced end of the carriage is provided with a forwardly extending ear 29 pivotally connected to the link 30 (see Fig. 1). The link 30 is pivotally connected to the crank arm 31 secured to an oscillating shaft 32 carried in brackets on the forward end plate. The shaft 32 extends transversely of the carriage and is provided with another crank arm 33 connected by the push rod 34 to the crank arm 35 on the rock shaft 11.

The top opposed edges of the end plates 26 are rabbeted or shouldered as at 36 and strips 37 are secured to the tops of the end plates to form slideways 38 for guiding a loading slide transversely of the loading conveyor 4. There is a slide positioned one on each carriage on either side of the loading conveyor and each slide consists of a longitudinally extending strap or bar 39 to the ends of which are attached shoes 40 slidable in the slideways 38. The upper surface of the bar 39 is provided with a series of raised blocks 41, the machine illustrated having three blocks on each slide bar. The blocks are transversely grooved to receive the outer ends of loading bars 42 which are removably held in place by suitable studs and bolts. The underside of the slide bar 39 is provided with a pair of depending brackets 43 between which is supported an actuating bar 44. The bar 44 is rectangular in cross section except at its ends where it is rotatably journaled in the brackets 43.

Figure 4:
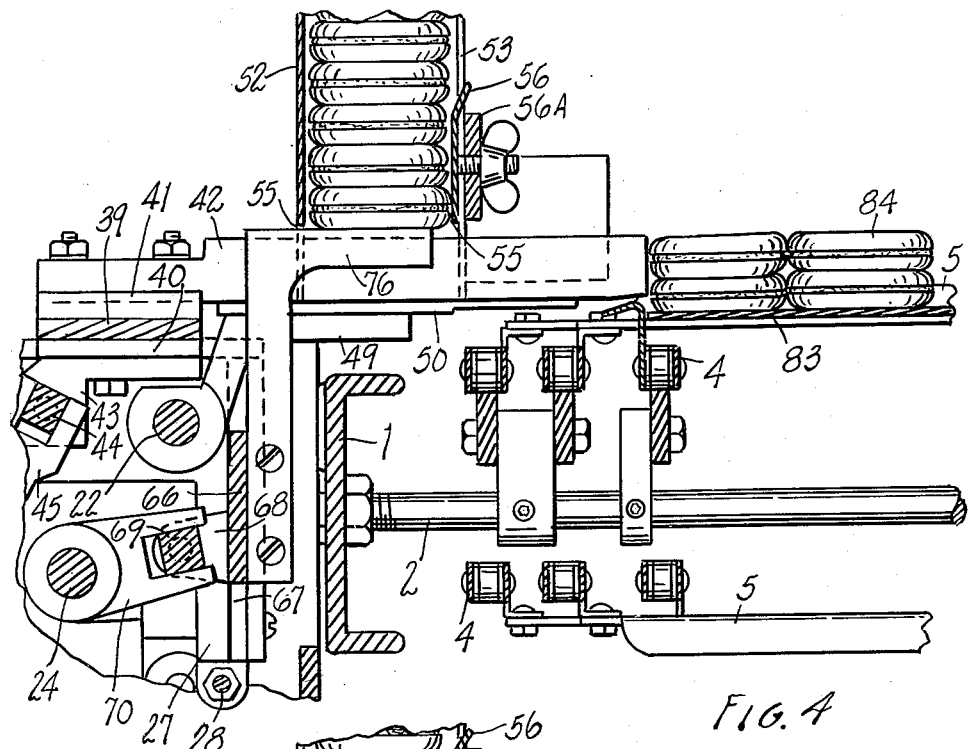
Fig. 4 is a fragmentary transverse vertical cross sectional view along the broken line 4—4 in Fig. 3, and showing the loading bar in advanced position.
Figure 5:
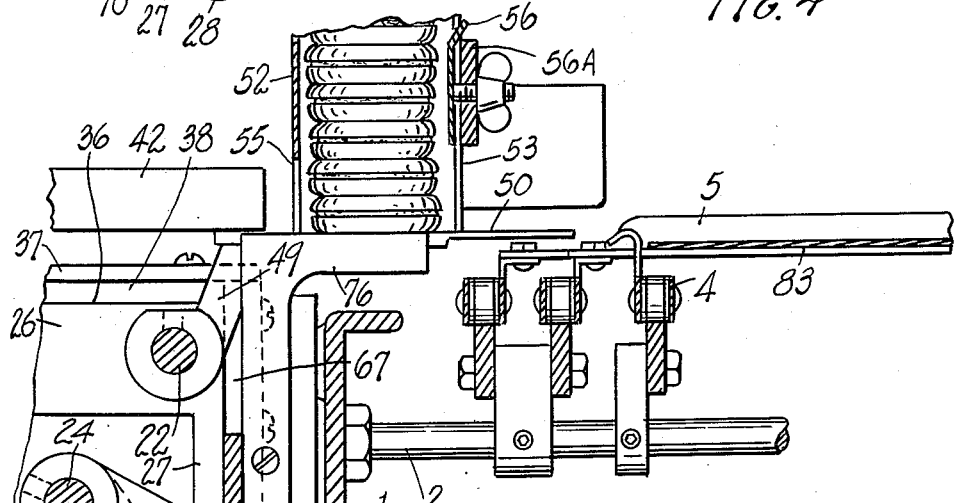
Fig. 5 is a fragmentary transverse vertical cross sectional view similar to Fig. 4 but showing the article loading bar in retracted position.

The bar 44 on the loading slide is engaged between the bifurcations on the end of a crank arm 45 secured to the rock shaft 23 (see Fig. 2). The rock shaft 23 is provided with another crank arm 46, the outer end of which is pivotally connected to the adjustable push rod 47. The lower end of the push rod 47 is pivotally connected to a crank arm 48 secured to each end of the rock shaft 12 so that oscillation of the rock shaft will result in transverse reciprocating motion of the loading slide. The bifurcated end of the crank arm 45 has a sliding connection with the rectangular mid-section of the bar 44 so that actuation of the loading slide is not interrupted by longitudinal reciprocation of the carriage as previously described. Reciprocating motion of the loading slide will cause the loading bars to be moved inwardly over the loading conveyor as shown in Fig. 4 and outwardly to a retracted position as shown in Figs. 2 and 5.

Non-rotatably secured to the slide rods 22 on each side of the loading conveyor are a series of angular hopper supporting brackets 49 which extend upwardly and inwardly toward the loading conveyor and form supports for a series of base plates 50. In the machine illustrated each slide rod 22 supports four base plates 50 which are spaced longitudinally of the loading conveyor to provide three elevator slots through which the loading bars 42 are slidable.

The base plates 50 are provided with upwardly extending studs 51 and are arranged to support loading hoppers 52. The hoppers 52 are hollow tubes curved outwardly at their upper ends. The inner walls of the tubes are cut away to form slots 53 to facilitate initial filling of the hoppers with biscuits or cookies. The lower ends of the hoppers are provided with longitudinally outturned horizontal flanges 54 through which the studs 51 from the base plates 50 extend. Wing nuts are provided for clamping the flanges 54 to the base plates to support the hoppers.

The inner and outer walls of the hoppers are cut away on the lower ends thereof as at 55 (see Figs. 1 and 4) to provide an aperture through which the loading bars 42 are reciprocated by the loading slide. Stops comprising inner clips 56 and outer clamp bars 56A bridging the slots 53 are provided on each hopper to adjustably limit the number of biscuits which may be pushed out of the hoppers by the loading bars 42.

The side plates 26 of each of the carriages are provided with an upstanding arm 57 to which is secured a generally vertical support 58 spaced slightly outwardly from the hoppers 52. The tops of the supports 58 are connected by a cross bar 59 defining a journal directly above each loading bar. The journals in the cross bar are inclined upwardly and inwardly and are arranged to receive pivot pins 60 secured to the bottom of the blocks 61. The blocks 61 are in turn secured on the underside of the loading chutes 62. A loading chute is provided for each hopper. The inner ends of the loading chutes 62 extend into the out-turned upper ends of the hoppers 52 and the outer ends of the chutes 62 are provided with inclined depending pivot pins 63 (see Fig. 2) extending through holes provided therefor in a fixed cross bar 64. The fixed bar 64 is supported at its ends upon the outwardly inclined brace rods 65 having their lower ends secured to the longitudinal connecting plate 21 of the pedestal 16. Thus as the carriage on each side of the loading conveyor is reciprocated longitudinally, the hoppers 52 and inner ends of the loading chutes will reciprocate along with the carriage and the outer ends will remain fixed and pivot about the axes of the pins 63.

In order to prevent the stacks of cookies in the hoppers 52 from falling abruptly each time the loading bars 42 are retracted, each carriage is provided with an elevator consisting of a longitudinally extending slide bar 66. The ends of the slide bar are slidable in vertical slideways 67 formed on the inner edges of the side plates 26 and their depending portions 27. The outer side of the elevator slide bar 66 is provided with outwardly extending ears 68 rotatably supporting actuating rods 69 therebetween. The mid portions of the actuating rods 69 are rectangular in cross section and engaged between the bifurcations on the ends of the crank arms 70 secured to the rock shaft 24. The end of the rock shaft 24 is provided with a crank arm 71, the free end of which is pivotally connected to a push rod 72 (see Figs. 1 and 5) extending downwardly to an elevator crank arm 73 secured to the end of the rock shaft 10. The elevator crank arm 73 is provided with a radially extending slot in which the block 74 is slidably mounted and arranged to be moved radially with respect to the rock shaft 10 by manipulation of the thumb screw 75.

The inner face of the elevator bar 66 is provided with pairs of upwardly and inwardly extending angular lift members 76 which are arranged along the elevator bar 66 so as to move upwardly through the elevator openings between the base plates 50 and between the cutaway portions 55 of each hopper 52. It will thus be seen that as the rock shaft 10 is oscillated, the crank 73 and push rod 72 will actuate the rock shaft 24 and crank arm 70 to raise and lower the actuator bar 69 and elevator bar 66. The angular lift members 76 will therefore be reciprocated upwardly into the hoppers 52 on either side of the loading bars 42.

Raising of the lift members 76 supports the stacks of biscuits or cookies in the hoppers 52 freely above the loading bars 42 while the loading bars are advanced inwardly toward the loading conveyor and returned to their retracted position. The lift members are lowered after the loading bars have been retracted to position a new series of cookies in front of the ends of the loading bars 42. In this manner the stacks of cookies are lowered gently in flat position instead of being allowed to drop freely and break the lower cookies in the stacks. Attention is called to the fact that the vertical distance through which the lift members 76 may be made to travel is readily adjustable by turning the thumb screw 75 to vary the position of the pivot block 74 on the crank arm 73. By adjusting the length of travel of the lift members, the machine may be adjusted to accommodate cookies or biscuits of different thicknesses or to vary the number of biscuits in each stack which will be positioned in front of the loading bars. The loading bars 42 being easily removable from the block portions 41 of the bar 39 may be replaced with other loading bars of different thickness to engage and load more or less biscuits on each stroke. The biscuit engaging ends of the loading bars 42 are notched as at 77 (see Fig. 3) so that each stack of biscuits is pushed straight onto the loading panel.

Attention is now directed to Fig. 2 illustrating the mechanism for actuating the rock shafts 10, 11 and 12. The drive shaft 9 which is clutch connected to the sprocket 14 as previously described is provided with three cam disks 78 one for each of the three rock shafts. The cam disks 78 each define a cam groove 79 in which a cam roller 80 is positioned. The cam rollers 80 are carried on the ends of crank arms 81 which are secured one to each of the rock shafts 10, 11 and 12. Thus as the drive shaft 9 is rotated in timed relationship with the loading conveyor 4, the cam grooves 79 actuate the cam rollers and crank arms to oscillate the rock shafts in timed relationship with the movement of the loading conveyor. The contour of the cam groove 79 is not shown in detail since it will vary in different adaptations of my machine depending upon the relative lengths of the various crank arms employed in the loading mechanism and the length of travel of the carriages, slides and elevators. It will be readily understood that the cam grooves 79 are designed and shaped so that the rock shaft 11 will advance the carriages 26 in timed relationship with the pockets of the loading conveyor so that the hoppers 52 are positioned opposite and register with the ends of the pockets of the loading conveyor. After the carriage has been advanced to the limits of its travel in registry with one pocket on the loading conveyor, it will be retracted rapidly to register with the next succeeding pocket on the loading conveyor and commence another cycle of operation. Simultaneously with the action of the carriages just described the cam groove for actuating the rock shaft 12 will cause the loading bars 42 to advance inwardly over the pockets of the loading conveyor as soon as the hoppers and pockets are in registry. The loading bars will then be retracted laterally in time to clear the pockets for the retracting stroke of the carriages. The cam groove controlling the rock shaft 10 will have a contour which will raise the lift members 76 immediately after the advancing stroke of the loading bars has removed the lower cookies from the hoppers. It will then lower the lift members 76 at a uniform rate after the loading bars have been retracted and while the carriages are being retracted to position a new supply of cookies in the bottom of the hoppers for the next cycle of operation of the machine.

Figure 3:
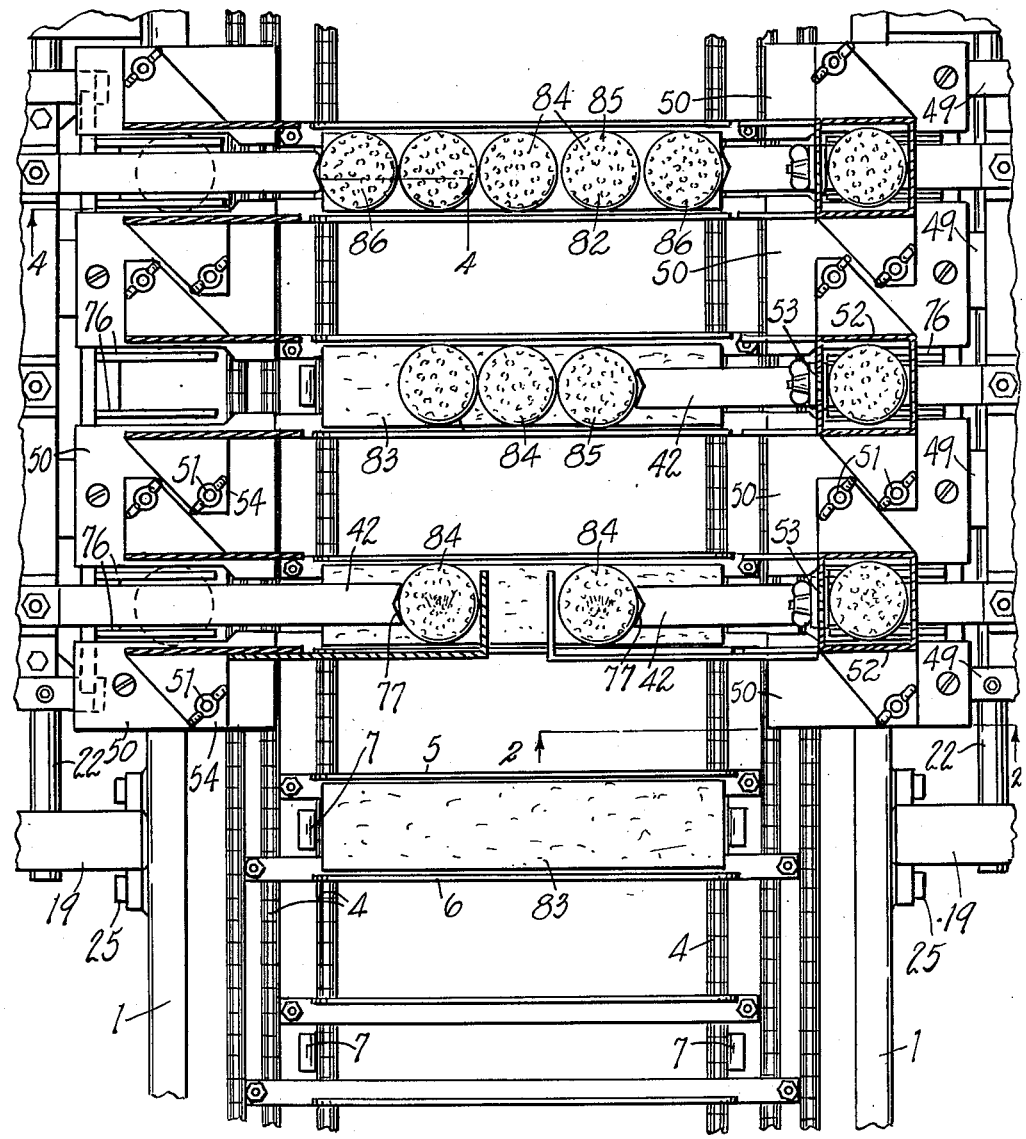
Fig. 3 is a fragmentary horizontal cross sectional view along the line 3—3 in Fig. 2.

The example of the machine illustrated is provided with three hoppers 52 and associated loading bars and lift members on each side of the loading conveyor and, as illustrated in Fig. 3, is adjusted to load five stacks of cookies indicated by the reference character 82 onto the bottom panels 83. In this particular arrangement the loading bars 42 associated with the first hoppers on each side of the loading conveyor are relatively long and arranged to advance initial stacks 84 onto opposite ends of the bottom panel and move the stacks well toward the center of the panel. The intermediate hopper on the left side of the loading conveyor as illustrated is not provided with a loading bar 42 and in the present setup of the machine is not filled with cookies. The intermediate hopper on the right side of the loading conveyor is provided with a loading bar approximately the same length as the loading bars associated with the initial hoppers and functions to advance a second stack 85 onto the right hand end of the bottom panel pushing the previously loaded stack 84 to the center of the panel. The final hoppers on each side of the loading conveyor are provided with relatively short loading bars 42 and are arranged to advance end stacks 86 onto each end of the bottom panel to complete the loading operation. It is therefore evident that each successive bottom panel 83 is advanced through three loading positions in the cycle of operation, the initial loading bars loading two stacks one on each end, the intermediate station loading a single stack and the final station loading the final stacks of biscuits.

Should it be desired to load packages of biscuits in different arrangements that that just described, various arrangements are possible by adding or removing some of the loading bars 42 to render different hoppers of the loading machine inoperative. Thus six stacks of cookies could be loading on the bottom panels by adding a loading bar to the intermediate station on the left side of the loading machine or four stacks of cookies could be loading by eliminating any pair of loading bars on opposite sides of the loading mechanism.

Once set up, my mechanism will rapidly load biscuits or cookies with a smooth, gentle action which will not break or crumble soft cookies and the only manual attention required is to feed the hoppers 52 by placing stacks of cookies on the loading chutes 62. The loading of the chutes 62 is simplified by the fact that the chutes have the fixed pivots 63 so that the operator can always place the fresh cookies in the same position without attempting to catch or synchronize his motions with an oscillating loading chute.

In have thus described a highly practical commercial embodiment of my loading machine which is readily adjustable throughout a wide range of operating arrangements. I have not attempted to show all possible arrangements and modifications of my machine as such adaptations should be readily apparent from the foregoing description.

Having thus described my invention, what I claim as new and desire to secure by Letters Patent is:

1. A biscuit loading machine for loading stacks of biscuits on the flights of a continuously moving conveyor comprising, a base arranged to be positioned under said conveyor and having a plurality of rock shafts journaled therein and extending beyond each side thereof, a pedestal secured to each side of said base and extending upwardly on each side of said conveyor, a carriage on each of said pedestals and slidable longitudinally thereon parallel to said conveyor, crank and link mechanisms connected between said carriages and cranks on the ends of one of said rock shafts for oscillating said carriages, slide members slidable transversely of said carriages, other crank and link mechanisms associated with each of said slide members arranged to oscillate said slide members from another of said rock shafts, said last mentioned mechanisms having sliding connections with said slide members so as to be operable independently of longitudinal movement of said carriages, a plurality of vertically disposed loading hoppers supported on each of said carriages on each side of said conveyor, the lower ends of said hoppers defining transverse openings, a plurality of loading bars removably secured to said slide members and reciprocable therewith to be advanced through said openings in said hoppers toward said loading conveyor, the inner ends of said loading bars being notched outwardly, stop plates adjustably secured to the inner sides of said hoppers to limit the height of the openings therein, elevator members slidable vertically on said carriage members, linkage connected between each of said elevator members and cranks on the ends of a third of said rock shafts for oscillating said elevator members, said last mentioned linkage having radially adjustable connections with the cranks on said third rock shaft to vary the amplitude of oscillation of said elevator members, pairs of lift members carried by said elevator members and arranged to be reciprocated thereby along each side of said loading bars into said hoppers, a longitudinal support on each of said carriages positioned above said loading bars and defining inclined journals opposite each of said hoppers, a plurality of loading chutes having their inner ends associated with the upper ends of said hoppers and having pivotal connections with said journals, a fixed support on each of said pedestals, each of said loading chutes having a fixed pivotal connection on one of said fixed supports, a driving shaft in said base arranged to be driven in timed relationship to said conveyor and having three cam disks thereon, said cam disks defining cam grooves, and a crank arm on each of said rock shafts and having cam rollers thereon arranged to be actuated by said cam grooves.

2. A biscuit loading machine for loading stacks of biscuits on the flights of a continuously moving conveyor comprising a base arranged to be positioned under said conveyor and having a plurality of rock shafts journaled therein and extending beyond each side thereof, a pedestal secured to each side of said base and extending upwardly on each side of said conveyor, a carriage on each of said pedestals and slidable longitudinally thereon parallel to said conveyor, linkage connected between said carriages and cranks on the ends of one of said rock shafts for oscillating said carriages, slide members slidable transversely of said carriages, linkage associated with each of said slide members arranged to oscillate said slide members from another of said rock shafts, said last mentioned linkages having sliding connections with said slide members so as to be operable independently of longitudinal movement of said carriages, a plurality of vertically disposed loading hoppers supported on said carriages on each side of said conveyor, the lower ends of said hoppers defining transverse openings, a plurality of loading bars removably secured to said slide members and reciprocable therewith to be advanced through said openings in said hoppers toward said loading conveyor, elevator members slidable vertically on said carriage members, linkage connected between each of said elevator members and cranks on a third of said rock shafts for oscillating said elevator members, said last mentioned linkages having radially adjustable connections with the crank on said third rock shaft to vary the amplitude of oscillation of said elevator members, pairs of lift members carried by said elevator members and arranged to be reciprocated upwardly on each side of said loading bars, a longitudinal support on each of said carriages positioned above said loading bars and defining an inclined journal opposite each of said hoppers, a plurality of loading chutes having their inner ends associated with the upper ends of said hoppers and having pivotal connections with said journals, and a fixed support on each of said pedestals, each of said loading chutes having a fixed pivotal connection with said fixed support.

3. A biscuit loading machine for loading stacks of biscuits on the flights of a continuously moving conveyor comprising a base having a plurality of rock shafts journaled therein, a pedestal secured to each side of said base and extending upwardly on each side of said conveyor, a carriage on each of said pedestals and slidable longitudinally thereon parallel to said conveyor, linkage connected between said carriages and cranks on one of said rock shafts for oscillating said carriages, slide members slidable transversely of said carriages, linkage associated with each of said slide members arranged to oscillate said slide members from another of said rock shafts, said last mentioned linkages having sliding connections with said slide members so as to be operable independently of longitudinal movement of said carriages, a plurality of vertically disposed loading hoppers supported on said carriages on each side of said conveyor, the lower ends of said hoppers defining transverse openings, a plurality of loading bars removably secured to said slide members and reciprocable therewith to be advanced through said openings in said hoppers toward said loading conveyor, elevator members slidable vertically on said carriage members, linkage connected between each of said elevator members and cranks on a third of said rock shafts for oscillating said elevator members, said last mentioned linkages having radially adjustable connections to vary the amplitude of oscillation of said elevator members, lift members carried by said elevator members and arranged to be reciprocated upwardly on each side of said loading bars, a longitudinal support on each of said carriages positioned above said loading bars and defining an inclined journal opposite each of said hoppers, a plurality of loading chutes having their inner ends associated with the upper ends of said hoppers and having pivotal connections with said journals, and a fixed support on each of said pedestals, each of said loading chutes having a fixed pivotal connection with said fixed support.

4. A biscuit loading machine for loading stacks of biscuits on the flights of a continuously moving conveyor comprising a base having a plurality of rock shafts journaled therein, a pedestal secured to each side of said base and extending upwardly on each side of said conveyor, a carriage on each of said pedestals and slidable longitudinally thereon parallel to said conveyor, crank and link mechanisms connected between said carriages and cranks on one of said rock shafts for oscillating said carriages, slide members slidable transversely of said carriages, other crank and link mechanisms associated with each of said slide members arranged to oscillate said slide members from another of said rock shafts, said other crank and link mechanisms having sliding connections with said slide members so as to be operable independently of longitudinal movement of said carriages, a plurality of vertically disposed loading hoppers supported on said carriages on each side of said conveyor, a plurality of loading bars secured to said slide members and reciprocable therewith to be advanced across the bottoms of said hoppers toward said loading conveyor, elevator members slidable vertically on said carriages, third crank and link mechanisms connected between said elevator members and cranks on a third of said rock shafts for oscillating said elevator members, said third crank and link mechanisms having a radially adjustable connection with the crank on said third rock shaft to vary the amplitude of oscillation of said elevator members, lift members carried by said elevator members and arranged to be reciprocated upwardly into said hoppers, a plurality of loading chutes having their inner ends associated with the upper ends of said hoppers and having pivotal connections with respect thereto, and a fixed support on each of said pedestals, the outer ends of said loading chutes having a fixed pivotal connection with said fixed supports.

5. A biscuit loading machine for loading stacks of biscuits on the flights of a continuously moving conveyor comprising a base having a plurality of rock shafts journaled therein, a pedestal secured to each side of said base and extending upwardly on each side of said conveyor, a carriage on each of said pedestals and slidable longitudinally thereon parallel to said conveyor, crank and link mechanisms connected between said carriages and cranks on one of said rock shafts for oscillating said carriages, slide members slidable transversely of said carriages, other crank and link mechanisms associated with each of said slide members arranged to oscillate said slide members from another of said rock shafts, said other crank and link mechanisms having sliding connections with said slide members so as to be operable independently of longitudinal movement of said carriages, a plurality of vertically disposed loading hoppers supported on said carriages on each side of said conveyor, a plurality of loading bars secured to said slide members and reciprocable therewith to be advanced across the bottoms of said hoppers toward said loading conveyor, elevator members slidable vertically on said carriages, third crank and link mechanisms connected between said elevator members and cranks on a third of said rock shafts for oscillating said elevator members, lift members carried by said elevator members and arranged to be reciprocated upwardly into said hoppers, a plurality of loading chutes having their inner ends associated with the upper ends of said hoppers and having pivotal connections with respect thereto, and a fixed support on each of said pedestals, the outer ends of said loading chutes having a fixed pivotal connection with said fixed supports.

6. A biscuit loading machine for loading stacks of biscuits on the flights of a continuously moving conveyor comprising a base having a plurality of rock shafts journaled therein, a pedestal secured to each side of said base and extending upwardly on each side of said conveyor, a carriage on each of said pedestals and slidable longitudinally thereon parallel to said conveyor, crank and link mechanisms connected between said carriages and cranks on one of said rock shafts for oscillating said carriages, slide members slidable transversely of said carriages, other crank and link mechanisms associated with each of said slide members arranged to oscillate said slide members from another of said rock shafts, said other crank and link mechanisms having sliding connections with said slide members so as to be operable independently of longitudinal movement of said carriages, a plurality of vertically disposed loading hoppers supported on said carriages on each side of said conveyor, a plurality of loading bars secured to said slide members and reciprocable therewith to be advanced across the bottoms of said hoppers toward said loading conveyor, elevator members slidable vertically on said carriages, third crank and link mechanisms connected between said elevator members and cranks on a third of said rock shafts for oscillating said elevator members, and lift members carried by said elevator members and arranged to be reciprocated upwardly into said hoppers.

7. Loading mechanism for loading biscuits on the flights of a continuously moving loading conveyor comprising a base having three rock shafts journaled therein, a drive shaft arranged to be driven in timed relationship with said conveyor, cam disks on said drive shaft defining cam grooves associated with crank arms secured to said rock shafts, a pedestal extending above said base on one side of said conveyor and including end plates defining longitudinally extending journals, slide rods positioned in said journals, a carriage including end plates secured to said slide rods, a first crank secured to one of said rock shafts, a second crank secured to one end plate of said pedestal, a push rod connected between said first and second cranks, a link connected between said second crank and an end plate of said carriage, a slide bar extending longitudinally of said carriage and slidable transversely thereof, loading bars removably secured to said slide bar and arranged to be projecting over said conveyor in the advanced position of said slide bar, an actuating rod rotatably carried on the underside of said slide bar and having a non-circular mid portion, a third crank mounted on said pedestal and rotatable about a longitudinal axis, one arm of said third crank having a sliding connection with the mid-section of said actuating rod, a second push rod connected between another arm of said third crank and a fourth crank arm on another of said rock shafts whereby said loading bars will be advanced transversely of said carriage while said carriage is advancing and retracted prior to retraction of said carriage, loading hoppers supported on said carriage and defining transverse openings through which said loading bars are reciprocated, an elevator bar slidable vertically on said carriage and having a pair of outwardly extending ears rotatably supporting a second actuating rod, said second actuating rod having a mid-section of non-circular cross section, a second rock shaft journaled between said end plates on said pedestal and parallel to said loading conveyor, a bifurcated crank on said second rock shaft engageable with the mid-section of said second actuating rod, a second crank on said second rock shaft connected to a second push rod, said second push rod having a radially adjustable connection with a third of said rock shafts in said base, and lift members secured to said elevator bar, said lift members being positioned in pairs on each side of said loading bars.

8. Loading mechanism for loading biscuits on the flights of a continuously moving loading conveyor comprising a base having three rock shafts journaled therein, a drive shaft arranged to be driven in timed relationship with said conveyor, cam disks on said drive shaft defining cam grooves associated with crank arms secured to said rock shafts, a pedestal extending above said base on one side of said conveyor and including end plates defining longitudinally extending journals, a carriage including end plates slidably supported in said journal, a first crank secured to one of said rock shafts, a second crank secured to one end plate of said pedestal, a push rod connected between said first and second cranks, a link connected between said second crank and an end plate of said carriage, a slide bar extending longitudinally of said carriage and slidable transversely thereof, loading bars secured to said slide bar and arranged to be projecting over said conveyor in the advanced position of said slide bar, an actuating rod rotatably carried on said slide bar, a third crank mounted on said pedestal and rotatable about a longitudinal axis, one arm of said third crank having a sliding connection with said actuating rod, a second push rod connected between another arm of said third crank and a fourth crank arm on another of said rock shafts whereby said loading bars will be advanced transversely of said carriage while said carriage is advancing and retracted prior to retraction of said carriage, loading hoppers supported on said carriage and under which said loading bars are reciprocated, an elevator bar slidable vertically on said carriage and having a pair of outwardly extending ears supporting a second actuating rod, a second rock shaft journaled between said end plates on said pedestal and parallel to said loading conveyor, a bifurcated crank on said second rock shaft engageable with said second actuating rod, a second crank on said second rock shaft connected to a second push rod, said second push rod having a radially adjustable connection with a third of said rock shafts in said base, and lift members secured to said elevator bar, said lift members being positioned in pairs on each side of said loading bars.

9. Loading mechanism for loading biscuits on the flights of a continuously moving loading conveyor comprising a base having three rock shafts journaled therein, a drive shaft arranged to be driven in timed relationship with said conveyor, cam disks on said drive shaft defining cam grooves associated with crank arms secured to said rock shafts, a pedestal extending above said base on one side of said conveyor and including end plates defining longitudinally extending journals, slide rods positioned in said journals, a carriage including end plates secured to said slide rods, a first crank secured to one of said rock shafts, a second crank secured to one end plate of said pedestal, a push rod connected between said first and second cranks, a link connected between said second crank and an end plate of said carriage, a slide bar extending longitudinally of said carriage and slidable transversely thereof, loading bars removably secured to said sliding bar and arranged to be projected over said conveyor in the advanced position of said slide bar, an actuating rod carried on the underside of said slide bar, a third crank mounted on said pedestal and rotatable about a longitudinal axis, one arm of said crank having a sliding connection with said actuating rod, a second push rod connected between another arm of said third crank and a fourth crank arm on another of said rock shafts whereby said loading bars will be advanced transversely of said carriage while said carriage is advancing and retracted prior to retraction of said carriage, loading hoppers supported on said carriage and defining transverse openings through which said loading bars are reciprocated, an elevator bar slidable vertically on said carriage and having a pair of outwardly extending ears rotatably supporting a second actuating rod, a second rock shaft journaled between said end plates on said pedestal and parallel to said loading conveyor, a bifurcated crank on said second rock shaft slidably engageable with said second actuating rod, a second crank on said second rock shaft connected to a second push rod, said second push rod having a pivotal connection to a third of said rock shafts in said base, and lift members secured to said elevator bar, said lift members being positioned in pairs arranged to be elevated into said hoppers.

10. Loading mechanism for loading articles on the flights of a continuously moving loading conveyor comprising a base having rock shafts journaled transversely therein, a drive shaft arranged to be driven in timed relationship with said conveyor, cam members on said drive shaft defining cam grooves associated with crank arms secured to said rock shafts, a pedestal extending above said base on one side of said conveyor and including end plates defining longitudinally extending journals, slide rods positioned in said journals, a carriage including end plates secured to said slide rods, a first crank secured to one of said rock shafts, a second crank secured to one end plate of said pedestal, a push rod connected between said first and second cranks, a link connected between said second crank and an end plate of said carriage, a slide bar extending longitudinally of said carriage and slidable transversely thereof, loading bars removably secured to said slide bar and arranged to be projecting over said conveyor in the advanced position of said slide bar, an actuating rod carried on the underside of said slide bar, a third crank mounted on said pedestal and rotatable about a longitudinal axis, one arm of said third crank having a sliding connection with said actuating rod, a second push rod connected between another arm of said third crank and a fourth crank arm on another of said rock shafts whereby said loading bars will be advanced transversely of said carriage while said carriage is advancing and retracted prior to retraction of said carriage, and hoppers for articles to be loaded supported on said carriage and defining transverse openings through which said loading bars are reciprocated.

11. Loading mechanism for loading articles on the flights of a continuously moving loading conveyor comprising a base having rock shafts journaled therein, a drive shaft arranged to be driven in timed relationship with said conveyor, cam members on said drive shaft associated with crank arms secured to said rock shafts, a pedestal extending above said base on one side of said conveyor and including end plates defining longitudinally extending journals, a carriage including end plates slidably mounted in said journals, a first crank secured to one of said rock shafts, a second crank secured to one end plate of said pedestal, a push rod connected between said first and second cranks, a link connected between said second crank and an end plate of said carriage, a slide bar extending longitudinally of said carriage and slidable transversely thereof, loading bars removably secured to said slide bar and arranged to be projecting over said conveyor in the advanced position of said slide bar, an actuating rod carried on said slide bar, a third crank mounted on said pedestal and rotatable about a longitudinal axis, one arm of said third crank having a sliding connection with said actuating rod, a second push rod connected between another arm of said third crank and a fourth crank arm on another of said rock shafts whereby said loading bars will be advanced transversely of said carriage while said carriage is advancing and retracted prior to retraction of said carriage, and hoppers for articles to be loaded supported on said carriage and defining transverse openings through which said loading bars are reciprocated.

12. In a device for loading stacks of similar articles on the flights of a continuously moving conveyor, the combination of a plurality of hoppers positioned longitudinally along the side of said conveyor, the spacing of said hoppers being equal to the spacing of said flights on said conveyor, a carriage for supporting said hoppers, a pedestal for supporting said carriage for reciprocating motion longitudinally of said conveyor, a base for supporting said pedestal, a loading slide reciprocably mounted on said carriage for motion transversely of said conveyor, loading bars removably secured to said slide and arranged to reciprocate underneath said hoppers, an elevator member slidably mounted on said carriage and reciprocable in a generally vertical plane, lift members on said elevator member and arranged to be lifted thereby into the bottoms of said hoppers, and cam actuated driving mechanism mounted in said base and arranged to be driven in timed relationship with said conveyor, said driving mechanism being arranged to advance said carriage at the same speed as said conveyor and in registry with the flights thereof and retract said carriage into registry with a succeeding flight, said driving mechanism further being arranged to advance said slide member while said carriage is advancing and to retract said slide member prior to retraction of said carriage, said driving mechanism further being arranged to raise said elevator member prior to advancing said slide member and to retract said elevator member subsequent to the retraction of said slide member.

13. In a device for loading stacks of similar articles on the flights of a continuously moving conveyor, the combination of a plurality of hoppers positioned longitudinally along the side of said conveyor, the spacing of said hoppers being equal to the spacing of said flights on said conveyor, a carriage for supporting said hoppers, a pedestal for supporting said carriage for reciprocating motion longitudinally of said conveyor, a base for supporting said pedestal, a loading slide reciprocably mounted on said carriage for motion transversely of said conveyor, loading bars secured to said slide and arranged to reciprocate underneath said hoppers, and cam actuated driving mechanism mounted in said base and arranged to be driven in timed relationship with said conveyor, said driving mechanism being arranged to advance said carriage at the same speed as said conveyor and in registry with the flights thereof and retract said carriage into registry with a succeeding flight, said driving mechanism further being arranged to advance said slide member while said carriage is advancing and to retract said slide member prior to retraction of said carriage.

14. In a device for loading stacks of similar articles on the flights of a continuously moving conveyor, the combination of a hopper positioned along the side of said conveyor, a carriage for supporting said hopper, a pedestal for supporting said carriage for reciprocating motion longitudinally of said conveyor, a base for supporting said pedestal, a loading slide reciprocably mounted on said carriage for motion transversely of said conveyor, a loading bar secured to said slide and arranged to reciprocate underneath said hopper, and cam actuated driving mechanism mounted in said base and arranged to be driven in timed relationship with said conveyor, said driving mechanism being arranged to advance said carriage at the same speed as said conveyor and in registry with the flights thereof and retract said carriage into registry with a succeeding flight, said driving mechanism further being arranged to advance said slide member while said carriage is advancing and to retract said slide member prior to retraction of said carriage.

15. In a device for loading stacks of articles on the flights of a continuously moving conveyor, the combination of a hopper positioned along the side of said conveyor, a carriage for supporting said hopper, a pedestal for supporting said carriage for reciprocating motion longitudinally of said conveyor, a loading slide reciprocably mounted on said carriage for motion transversely of said conveyor, a loading bar secured to said slide and arranged to reciprocate underneath said hopper, a lift member on said elevator member and arranged to be lifted thereby into the bottom of said hopper, and driving mechanism arranged to be driven in timed relationship with said conveyor, said driving mechanism being arranged to advance said carriage at the same speed as said conveyor and in registry with a flight thereof and retract said carriage into registry with a succeeding flight, said driving mechanism further being arranged to advance said slide member while said carriage is advancing and to retract said slide member prior to retraction of said carriage.

16. In a machine for loading articles on the flights of a continuously moving conveyor, the combination of a carriage member reciprocable parallel to said conveyor, a slide member reciprocable transversely of said conveyor, a pedestal for supporting said members, one of said members being supported upon the other, a hopper supported upon said carriage member, a loading bar carried by said slide member and reciprocable therewith across the bottom of said hopper, and crank members carried on said pedestal for reciprocating said members in timed relationship with said conveyor whereby said carriage is advanced in registry with a flight of said conveyor and retracted to a succeeding flight and whereby said slide member is advanced while said carriage is advanced and retracted prior to retraction of said carriage.

17. In a loading machine of the type described, the combination of a fixed pedestal, a carriage slidably mounted on said pedestal, a generally vertical hopper supported on said carriage, a slide member slidably mounted on said carriage for motion normal to the path of motion of said carriage, a loading bar removably secured to said slide member and reciprocable therewith through the lower end of said hopper, a pair of rock shafts carried by said pedestal and rotatable about axes parallel to the path of motion of said carriage, an elevator member slidable vertically on said carriage and having a pair of lift members carried thereby and positioned on each side of said loading bar, an actuating rod carried by said elevator member, an actuating rod carried by said slide member, a pair of crank arms having bifurcated ends engageable with said actuating rods and secured to said rock shafts, and a power source for oscillating said rock shafts.

18. In a loading machine of the type described, the combination of a pedestal, a carriage slidably mounted on said pedestal, a generally vertical hopper supported on said carriage, a slide member slidably mounted on said carriage for motion normal to the path of motion of said carriage, a loading bar removably secured to said slide member and reciprocable therewith through the lower end of said hopper, an actuating bar on said slide member, an elevator member slidable verticaly on said carriage and having a pair of lift members carried thereby and positioned on each side of said loading bar, a second actuating bar carried by said elevator member, a pair of rock shafts carried by said pedestal and parallel to the path of said carriage, a pair of crank arms engageable with said actuating bars and rotatably drivingly connected to said rock shafts, and a power source for oscillating said rock shafts.

19. In an article loading machine, the combination of a pedestal, a carriage slidable longitudinally of said pedestal, a slide member slidably mounted on said carriage for motion normal to the direction of motion of said carriage, a loading bar secured to said slide member, a loading hopper secured to said carriage and having its lower end bridging said loading bar, a crank member rotatably mounted on said pedestal for rotation about an axis parallel to the direction of motion of said carriage, and another crank member connected to be driven from said first crank member and having a driving connection with a portion of said slide member, the connection between two of said members being longitudinally slidable to accommodate longitudinal movement of said carriage.

20. In an article loading machine of the type described, mechanism for translating articles to be loaded longitudinally in timed relation with a conveyor and transversely thereof, said mechanism comprising the combination of a fixed pedestal having a pair of side plates, said side plates supporting a carriage for sliding motion normal with respect to said plates and parallel to said conveyor, a first crank member carried by one of said plates and rotatable about an axis parallel thereto, said first crank being connected to said carriage, a second crank carried by the other of said side plates and rotatable about an axis normal to said plates, a rock shaft journaled in said plates and arranged to be oscillated by said second crank member, a slide member slidable on said carriage normal to the direction of motion of said carriage, an actuating bar having a rectangular cross section rotatably carried by said slide member, and a third crank having a bifurcated end engageable with said actuating bar, said third crank being secured to said rock shaft.

21. In an article loading machine of the type described, mechanism for translating articles to be loaded longitudinally in timed relation with a conveyor and transversely thereof, said mechanism comprising the combination of a pedestal having a pair of side plates, said plates supporting a carriage for sliding motion normal with respect to said plates and parallel to said conveyor, a first crank member carried by one of said plates and rotatable about an axis parallel thereto, said first crank being connected to said carriage, a rock shaft journaled in said side plates and arranged to be rotated by a second crank member, a slide member slidable on said carriage normal to the direction of motion of said carriage, an actuating bar carried by said slide member, and a third crank having a bifurcated end engageable with said actuating bar, said third crank being secured to said rock shaft.

22. In an article loading machine of the type described, mechanism for translating articles to be loaded longitudinally in timed relation with a conveyor and transversely thereof, said mechanism comprising the combination of a pedestal adapted to be mounted to extend transversely from one side of said conveyor, said pedestal supporting a carriage member for sliding motion normal with respect to said pedestal, and parallel to said conveyor, a first crank carried by said pedestal, a second crank carried by said pedestal and rotatable about an axis at right angles to the axis of rotation of said first crank, a slide member carried on said pedestal and slidable normal to the direction of motion of said carriage member, one of said members being slidable on the other, said first crank being connected to said other of said members to reciprocate the same, and an actuating bar carried by said one of said members, said second crank having a sliding and driving engagement with said actuating bar.

23. In an article loading machine of the type described, the combination of a pedestal having a pair of parallel side plates, a carriage slidably supported by said plates for motion normal thereto, an elevator member slidably supported on said carriage, an actuating member on said elevator member, a crank member rotatably supported on one of said plates and rotatable about an axis normal thereto, a rock shaft journaled in said plates and arranged to be oscillated by said crank member, and a bifurcated crank arm secured to said rock shaft having a sliding engagement with said actuating member for raising and lowering said elevator member.

24. In an article loading machine of the type described, mechanism for translating articles to be loaded longitudinally in timed relation with a conveyor and vertically to the level of the conveyor comprising the combination of a pedestal, a carriage slidably supported on said pedestal for motion longitudinally thereof and parallel to the line of motion of said conveyor, an elevator vertically slidably supported on said carriage, an actuating member on said elevator, a crank member rotatably supported on said pedestal and rotatable about an axis extending longitudinally of said pedestal, said crank member engaging said actuating member for raising and lowering said elevator, and an oscillating drive member on said pedestal engaging said crank member for driving the latter, the engagement between two of said members being longitudinally slidable to accommodate movement of said carriage.

25. In an article loading machine of the type described, the combination of a longitudinally reciprocable carriage, a base for said carriage, a generally vertical hopper having a laterally turned upper end supported on said carriage, a movable support member carried by said carriage and spaced thereabove, said support member defining a journal extending normally to the upper end of said hopper, a loading chute having one end arranged to discharge into said hopper, a pin on said chute supported in said journal, and a fixed support carried by said base and positioned laterally and vertically above said movable support member, said loading chute having a fixed pivotal connection with said fixed support.

26. In an article loading machine of the type described, the combination of a longitudinally reciprocable carriage, a base for said carriage, a hopper supported on said carriage, a movable support member carried by said carriage and spaced thereabove, a loading chute having one end arranged to discharge into said hopper, said discharge end on said chute being pivotally mounted on said movable support, and a fixed support carried by said base and positioned laterally and vertically above said movable support member, said loading chute having a fixed pivotal connection with said fixed support.

27. In an article loading device of the type described, mechanism for translating articles to be loaded longitudinally in timed relation with a conveyor and transversely thereof, said mechanism comprising the combination of a pedestal having a pair of longitudinally spaced side plates defining longitudinally extending journals, slide rods reciprocably mounted in said journals, carriage plates secured to said slide rods and parallel with said side plates, the upper opposed edges of said carriage plates being shaped to form slideways, a loading slide having shoes slidable in said slideways, a crank member carried by one of said side plates on said pedestal and rotatable about an axis parallel thereto, a link connected between one arm of said crank member and one of said carriage plates, and a push rod connected between another arm of said crank member, and an oscillating member carried on said pedestal.

28. In an article loading device of the type described, mechanism for translating articles to be loaded longitudinally in timed relation with a conveyor and transversely thereof, said mechanism comprising the combination of a pedestal having a pair of longitudinally spaced side plates defining longitudinally extending journals, a carriage having end plates and reciprocably supported in said journals, the opposed sides of said carriage plates defining slideways, a loading slide slidable in said slideways transversely of the conveyor, a crank member carried by one of said side plates and rotatable about an axis parallel thereto, a link connected between one arm of said crank member and one of said carriage plates, and a push rod connected between another arm of said crank member, and an oscillating member carried on said pedestal.

29. In an article loading device of the type described, mechanism for translating articles to be loaded longitudinally in timed relation with a conveyor and transversely thereof, said mechanism comprising the combination of a support having longitudinally extending slideways thereon and adapted to be positioned alongside of said conveyor, a carriage reciprocably supported on said slideways, a loading slide reciprocably supported on said carriage for motion transversely thereof, a crank member carried by said support and rotatable about an axis perpendicular to said conveyor, a link connected between one arm of said crank member and said carriage, and means driven in timed relationship with said conveyor for oscillating said crank.

30. The combination with a continuously moving conveyor provided with flights, of a carriage reciprocating in a path at the side of and parallel to the path of travel of the conveyor, a hopper carried by said carriage, feed means on said carriage for transferring articles from the bottom of the hopper to the conveyor, an upwardly facing inwardly inclined feed chute pivotally supported at its outer end and associated with said hopper to deliver thereto and to swing back and forth as the carriage is reciprocated.

31. The combination with a conveyor provided with flights, a carriage reciprocating in a path parallel to the path of travel of the conveyor, a hopper carried by said carriage, feed means for transferring articles from the hopper to the conveyor, between the flights thereof, a feed chute of upwardly facing channel section pivotally supported at its outer end, and associated with said hopper to deliver thereto and to swing back and forth on its pivot as the carriage is reciprocated.

32. The combination with a continuously moving conveyor provided with flights, of a carriage reciprocating in a path parallel to the path of travel of the conveyor, a hopper carried by said carriage, means on said carriage for transferring articles from the hopper to the conveyor, an upwardly facing feed chute delivering to said hopper, said feed chute being supported at its outer end to permit its inner end to swing back and forth with the hopper as the carriage is reciprocated.

JOHN W. SMITH.

REFERENCES CITED

The following references are of record in the file of this patent:

UNITED STATES PATENTS

| Number | Name | Date |
|---|---|---|
| 1,330,639 | Leumann | Feb. 10, 1920 |
| 1,492,864 | Straight | May 6, 1924 |
| 1,911,650 | Smith | May 30, 1933 |
| 1,984,981 | Neff | Dec. 18, 1934 |
| 2,408,838 | Wilckens et al. | Oct. 8, 1946 |